United States Patent [19]

Morgan

[11] Patent Number: 4,529,122

[45] Date of Patent: Jul. 16, 1985

[54] THERMOSTATIC STEAM TRAP ASSEMBLY

[75] Inventor: David L. Morgan, Stratford, Conn.

[73] Assignee: Seymour-Sheridan, Inc., Stratford, Conn.

[21] Appl. No.: 608,508

[22] Filed: May 9, 1984

[51] Int. Cl.³ .............................. F16T 1/10; F16T 1/22
[52] U.S. Cl. ...................................... 236/52; 137/192; 236/56
[58] Field of Search ........................... 236/52, 53, 56; 137/192, 196

[56] References Cited

U.S. PATENT DOCUMENTS

| 2,107,551 | 2/1938 | Simpson | 236/53 |
| 2,399,111 | 4/1946 | George, Sr. | 137/196 |
| 2,825,508 | 3/1958 | Velan et al. | 236/53 |
| 3,011,719 | 12/1961 | Jorgensen | 137/192 X |
| 3,147,920 | 9/1964 | McCormack, Jr. | 236/53 |
| 4,168,029 | 9/1979 | Mosher, Jr. | 236/52 |

Primary Examiner—William E. Tapolcai
Attorney, Agent, or Firm—Thomas L. Tully

[57] ABSTRACT

A steam trap valve assembly designed to be connected to a steam piping system to trap and remove water of condensation, air and other gasses from the steam piping system while preventing the escape of steam therethrough. The assembly comprises a housing having an upper inlet and a lower outlet, a buoyant float element within the housing and movable between raised, outlet-open position and lowered, outlet-closed position in which it seals the outlet in the absence of sufficient condensate in the housing to float the buoyant element. The float element is connected to the housing by means of a thermostatic member which maintains the float element in a raised, outlet-open position when cool but which releases the float element into lowered position, when heated, to seal the outlet in the absence of sufficient condensate in the housing to float the buoyant element.

10 Claims, 3 Drawing Figures

THERMOSTATIC STEAM TRAP ASSEMBLY

BACKGROUND OF THE INVENTION

Steam trap valve assemblies of various types are known for use in steam piping assemblies in order to automatically drain water condensates, air and other gasses from the system without permitting the escape of steam. Water condensates form in steam piping systems as the natural result of the cooling of the steam as the letter gives up its heat in the performance of its function, i.e., heat transfer to a radiator, mold, etc. Such condensates, unless removed from the steam conduit, can build up in various areas of the conduit, such as at bends, fittings, low spots, etc., and can block the flow of the steam to produce shock waves or "water hammer" forces which can damage the conduit.

Also, air and other noncondensable gasses, such as carbon monoxide and dioxide, can build up in the steam conduit, reducing the steam temperature, insulating the heat-transfer system and/or producing corrosive acidic condensates.

Conventional steam trap valve assemblies are known for the automatic purging of steam piping systems of undesirable condensates and gasses while preventing the escape of steam. Reference is made to my U.S. Pat. No. 2,914,251 which relates to such a steam trap valve assembly containing a heat-sensitive bellows means which not only opens the outlet to drain condensate and dissolved gasses but also closes the inlet to prevent the further entry of steam to the steam trap when the bellows means becomes overheated, thereby preventing damage to the bellows.

Such known steam trap valve assemblies are dependent on the cooling and contraction of the bellows in order to cause opening of the outlet and release of the condensate and dissolved gasses. Repeated operation of the bellows results in wear, particularly in cases where the expanded bellows directly exerts the pressure which forces the valve closure member against the outlet port to close the outlet. Also, in such cases failure of the bellows can leave the system open to the escape of steam.

Some such assemblies are designed to fail to closed position for safety purposes. However, the closure of the valve causes water to accumulate in the valve and in the conduit, which water can eventually freeze and burst the valve assembly and/or the conduit.

While the safety function performed by a steam trap valve assembly is essential, it is desirable to provide a steam trap assembly in which the compressive forces exerted against the bellows in expanded position are reduced or removed. It is also desirable to provide a steam trap valve assembly which has a high water discharge capacity under normal operating conditions and which will remain open to the discharge of accumulated amounts of condensate and closed to the flow of steam without causing the bellows to contract to open the outlet. It is also desirable to provide a steam trap valve assembly which will continue to permit the discharge of condensate so as to prevent the accumulation of a sufficient volume of water in the valve assembly to cause any harm if it does freeze.

It is also desirable to provide a steam trap valve assembly which will balance the pressures within the housing and within the bellows compartment so as to prevent damage to the bellows caused by the pressure within the bellows compartment becoming substantially higher than the pressure within the steam trap housing.

SUMMARY OF THE INVENTION

The present invention relates to a steam trap valve assembly of unique design incorporating a valve member which is always open to the discharge of large amounts of condensate, and a thermostatically-controlled buoyant outlet-closure member which is rendered inoperative at liquid temperatures but which is activated at steam temperatures into association with the valve member to close the outlet unless the volume of condensate present in the assembly is sufficient to float the buoyant member. Thus, the present steam trap valve assembly is activatable between two positions depending upon the presence of steam and the presence of water. In the absence of steam the buoyant member is maintained in a first position in which it cannot engage the valve member to close the outlet, and the latter is fully opened to provide the desired discharge capacity of water or air. In the presence of steam temperatures the buoyant member is released to a float position in which it will not cause the valve member to close the outlet in the presence of a sufficient volume of water within the assembly to float the buoyant member, but will depress the valve member to close the outlet when said volume of water is displaced by steam.

THE DRAWING

DISCUSSION OF THE INVENTION

Figure 1:
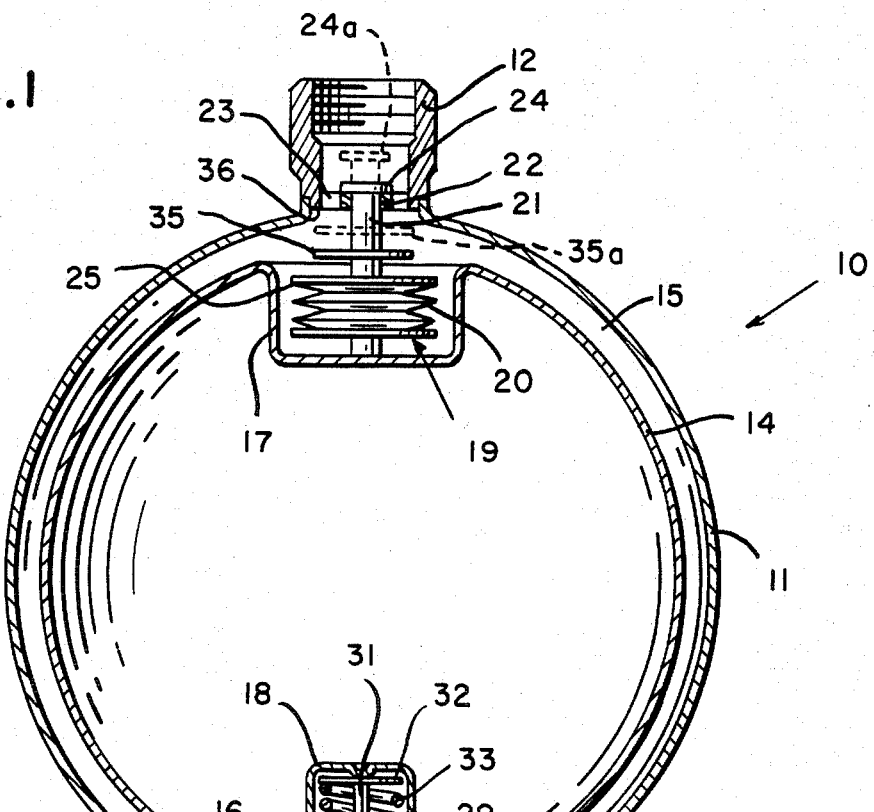
FIG. 1 is a vertical cross-section of a steam trap valve assembly according to a preferred embodiment of the present invention.

Referring to FIG. 1 of the drawing, the steam trap valve assembly 10 thereof comprises a spherical, water-tight housing 11 having an upper inlet fitting 12, designed to be connected to a steam conduit, and a lower outlet fitting 13, designed to be connected to a water drain conduit. Supported for vertical movement within the housing 11 is a spherical, water-tight buoyant member 14 having a diameter slightly smaller than that of the housing 11 to form a peripheral compartment 15 which is open to the inlet fitting 12 and which communicates with the outlet fitting 13 through a valve member 16. Buoyant member 14 includes diagonally-opposed radial cup recesses 17 and 18. The upper recess 17 has attached therewithin a bellows assembly 19 having an expansion compartment 20 and a radial stem 21 which is slidably mounted within the enlarged central opening 22 of a water-transmitting guide member 23 and which carries a flange cap 24 which is wider than the opening 22. The bellow assembly is illustrated in normal retracted position in which the bellows section 20 is retracted and the extension or stem 21, which is attached to the center of the top free plate 25 of the bellows, is withdrawn to a normal position in which the flange or cap 24 engages the supporting guide member 23 to lift the buoyant member 14 from the valve member 16 to open the valve to the outlet fitting 13. The guide member 23 at the inlet may be a grid member having an open network, i.e., a spoked wheel design, so that inlet water and steam are free to pass therethrough, even when the cap 24 covers the central opening 22, and to enter the peripheral compartment and flow freely through the open valve member 16. In the absence of steam temperatures, water and air pass out the outlet fitting 13 and are purged from the system. In such unheated or start-up position, the contracted condition of the bellows assembly 19 overrides the buoyancy of the float member 14 to keep the valve open until steam temperatures are encountered.

Figure 2:
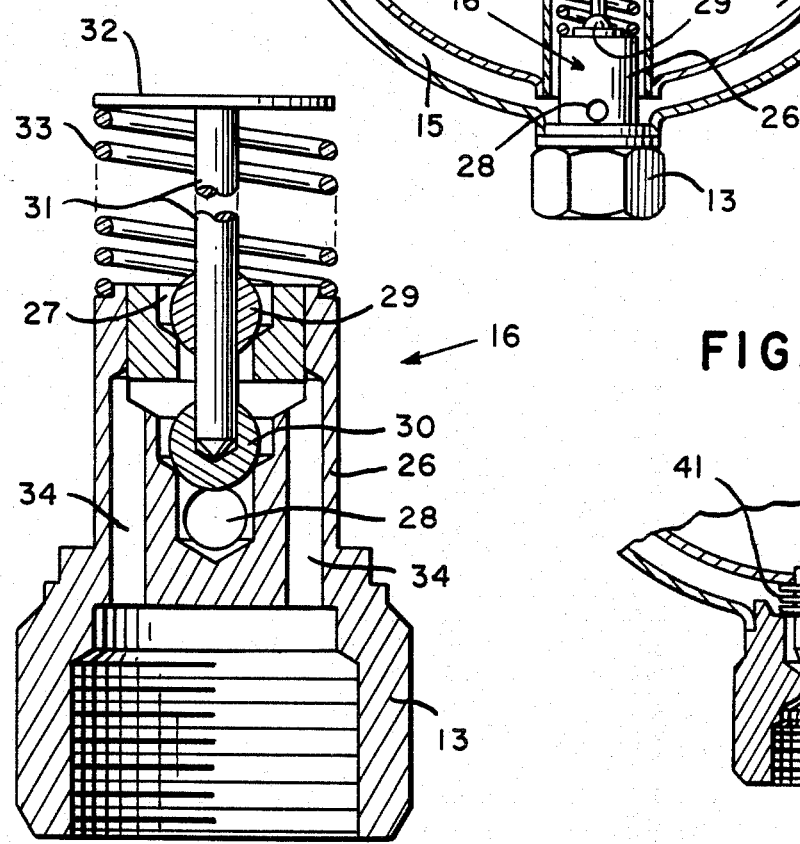
FIG. 2 is an enlarged vertical cross-section of the valve member of the assembly of FIG. 1.

The preferred valve member 16, shown more clearly in FIG. 2, is a balanced, dual orifice member comprising a housing 26 having upper and lower inlet ports 27 and 28, respectively, sealable by means of ball plugs 29 and 30, respectively, attached to a valve stem 31. Stem 31 is attached to spring plate 32, and a spring 33 is compressed between the underside of the plate 32 and the valve housing 26 to raise the plate 32 and valve stem 31 and unseat the ball plugs 29 and 30 to open the valve in the absence of sufficient downward force against the spring plate 32 to compress the spring 33 and seat the ball plugs 29 and 30 to close the valve.

In unheated condition, as shown in FIG. 1, the weight of the buoyant member 14, which is sufficient to apply the downward force necessary to close the valve member 16, is lifted from the valve member by the retracted unheated bellows assembly 19 to cause the spring 33 to open the valve member 16. This permits water and air to flow freely from the peripheral compartment 15 into both of the valve orifices 27 and 28 and out the spaced outlet passages 34 of the outlet fitting 13.

The novel dual orifice balanced valve member 16 is produced by providing an adjustable tight frictional fit between the upper ball plug 29 and the stem 31 so that when the stem is depressed to seat the lower ball plug 30 and seal the inlet port 28, the upper ball plug 29 can be forced down the stem 31 until it also becomes seated to seal the inlet port 27. This manipulation assures that both ports 27 and 28 will open and close simultaneously regardless of variations in valve housings.

The two inlet ports 27 and 28 are located so that port 27 opens above the ball plug 29 to provide a downward inlet force and port 28 opens below ball plug 30 to provide an upward inlet force to balance the opening and closing of the valve member so that the stem 31 is floated between open and closed positions to reduce operational noise and wear and to provide a larger flow area.

As shown by FIG. 1, the valve element 16 is a component of the outlet fitting 13 and is seated within the lower radial inverted cup recess 18 of the buoyant member 14. Space is provided between the outer circumference of the valve housing 26 and the inner circumference of the cup recess 18 to permit water and air to flow from the peripheral compartment 15 up into the cup recess 18 and into the upper inlet port 27 when ball plug 29 is unseated. Simultaneously, water and air can flow into inlet port 28.

In the aforementioned position, the valve element 16 is in the open position and is incapable of closing regardless of the volume of water or air flowing through the system, so long as the system is free of steam. As the system becomes heated and steam is generated, the steam entering the inlet fitting 12 will expand the bellows assembly 19 which is predesigned to expand when heated to steam temperatures. Generally, the bellows compartment of a conventional bellows assembly contains a liquid which volatilizes at the desired temperature to expand the bellows. Such expansion pushes the upper end plate 25 and the attached stem 21 up out of the cup 17 to move the end cap 24 up out of engagement with the guide member 23 to a position 24a, shown by means of broken lines in FIG. 1, causing the buoyant member 14 to become operative relative to the valve element 16, the weight of the buoyant element 14 being centered at the roof of inverted cup 18 against the spring plate 32. When sufficient condensate collects in the peripheral compartment 15 to float the buoyant member 14 and prevent its weight from being exerted against the spring plate 32, the valve element 16 will remain open to the flow of such water. When the compartment 15 fills with steam, the buoyant member 14 becomes unsupported and its weight is exerted against the spring plate 32, spring 33 and valve stem 31 to depress the stem 31 and seat the ball plugs 29 and 30 and simultaneously close both inlet ports 27 and 28, i.e., the bellows assembly has a sufficient stroke or length of expansion to close the outlet. Whenever sufficient condensate enters or forms within the peripheral compartment 15 to float the buoyant member 14, the valve element will open to permit such water to flow. However, no steam will be permitted to enter the valve element 16 because it will be blocked by the presence of at least a residual amount of water insufficient to float the buoyant member 14. Even if such residual amount of water should freeze, if the system is shut down, it cannot damage the assembly because of the spherical shape of the interior wall of the housing 11 and the free vertical mobility of the buoyant member 14.

The present steam trap valve assembly also preferably contains means for preventing the pressure within the bellows compartment 20 from becoming so excessive relative to the balancing pressure within the housing 15 that the bellows is caused to expand excessively, with resultant damage thereto. This is prevented by causing the inlet 12 to be closed by slightly excessive expansion of the bellows assembly 19 so that the pressure within the closed compartment 15 builds up, due to vaporization of the condensate therein, to balance the pressure with the bellows compartment 20. Thus, FIG. 1 illustrates the presence of a valve plate 35 which is fixed to the bellows stem 21 and which is movable with the stem 21 to sealingly engage the flange 36 on the underside of the inlet fitting 12 if the bellows assembly 19 expands to a slightly excessive extent. This can occur if there is a sudden loss of supply pressure to the inlet during the presence of steam temperatures, i.e., while the bellows is expanded. Under such abnormal condition, the excessive expansion of the bellows assembly 19 will move the plate 35 beyond its normally heat-extended inlet-open position 35a, shown by means of broken lines in FIG. 1, to an inlet-closed position in which the valve plate 35 is seated against inlet flange 36 to close the inlet 12 and to force the buoyant member 14 down against the spring plate 32 to close the valve member 16 and the outlet 13. Condensate trapped within the compartment 15 will be evaporated to generate a pressure outside the bellows compartment 20 which is essentially equal to the pressure therewithin, preventing damage to the bellows. When the unit cools, it will revert to normal operation in the manner discussed hereinbefore.

Figure 3:
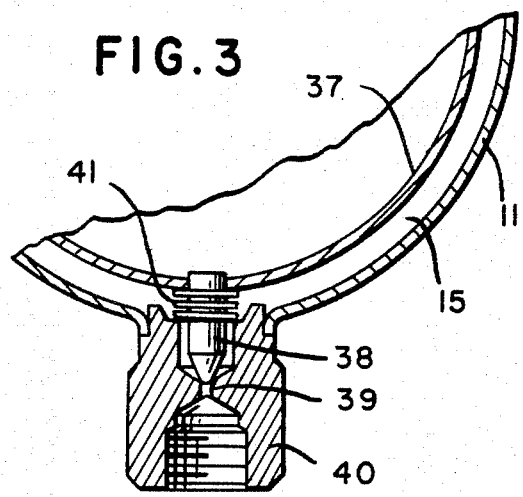
FIG. 3 is partial vertical cross-section of the lower portion of a steam trap valve assembly according to another embodiment of the present invention.

While the use of the balanced, dual orifice valve element of FIGS. 1 and 2 is preferred, it should be understood that the present steam trap valve assemblies can incorporate a more simple needle valve as illustrated by FIG. 3. Thus, the buoyant member 37 of FIG.

3 may have attached to the base thereof a radially-extending needle stem or conical plug 38 designed to close orifice 39 within the outlet fitting 40 under the free weight of the buoyant member 37, a compressed spring 41 preferably being present for centering purposes. As with the embodiment of FIGS. 1 and 2, the buoyant member 37 has an attached upper bellows assembly which lifts the member 37 to open the valve orifice 39 under normal operating conditions and which lowers the member 37 in the presence of steam to permit its weight to seat the conical plug 38 in orifice 39 in the absence of sufficient water within the peripheral compartment 15 to float the buoyant member 37.

Variations and modifications of the present invention will be apparent to those skilled in the art within the scope of the present claims.

I claim:

1. In a thermostatic steam trap valve assembly comprising a housing having an inlet designed to admit water, steam and gasses to a compartment therewithin, and having an outlet near the base thereof designed to permit water and gasses to flow from said compartment into a drain conduit, a bouyant element supported for vertical movement within said housing between a raised position in which said outlet is open to the flow of water and gasses from said compartment, and a lowered position in which said bouyant element closes said outlet in the absence of a sufficient volume of water within said compartment to float said bouyant element and open said outlet, and a thermostatic means which normally supports said bouyant element in raised position but which releases said bouyant element to lowered position in the presence of steam temperatures, the weight of said bouyant element being sufficient to cause the closure of said outlet in the absence of a sufficient volume of water within said compartment to float said bouyant member and open said outlet to the discharge of said water, the improvement in which said thermostatic means comprises a bellows assembly which is connected between the top of said bouyant element and an upper area of said housing, said bellows assembly including a bellows element supporting a movable extension which holds the bouyant element in raised position when the bellows is contracted and which releases the bouyant element to lowered position when the bellows is expanded, in which lowered position the bouyant element is capable of free vertical floating movement under the effects of water present within said compartment to open and close said outlet.

2. An assembly according to claim 1 in which said outlet comprises a passage and an associated depressable valve member which is depressed by the movement of the buoyant element to lowered position to close said outlet.

3. An assembly according to claim 2 in which said depressable valve member is attached to said buoyant element.

4. An assembly according to claim 2 in which said passage has lower and upper inlet orifices, and said depressable valve member comprises a valve stem supporting lower and upper orifice plugs which simultaneously control the flow of water from the compartment into said passage from above and below said valve member.

5. An assembly according to claim 1 in which said bellows assembly is attached to said buoyant element and said extension is slideably connected to said housing.

6. An assembly according to claim 5 in which the inlet is located at the top of the housing and includes a water-transmitting support member which slideably receives the bellows extension, and the top of the bellows extension comprises a flange which engages the top of the support member when the bellows is retracted to hold the buoyant element in raised position, the stroke of said bellows during expansion being sufficient to lower said buoyant element and close said outlet.

7. An assembly according to claim 6 in which said bellows extension also comprises a lower valve plate which engages the inlet and causes the buoyant member to seal the outlet if the pressure within the bellows becomes substantially greater than the pressure within the housing.

8. An assembly according to claim 6 in which said housing and said buoyant element are spherical, and said bellows assembly is attached to the spherical buoyant element within a recess therein.

9. An assembly according to claim 1 in which both said housing and said buoyant element are spherical, the latter being slightly smaller in diameter than the former to provide a peripheral water compartment therebetween.

10. An assembly according to claim 2 in which said housing and said buoyant element are spherical, and said buoyant element comprises a recess in the base thereof which receives the depressable valve member.

* * * * *